United States Patent
Okruhlica et al.

(10) Patent No.: US 9,691,360 B2
(45) Date of Patent: Jun. 27, 2017

(54) ALPHA CHANNEL POWER SAVINGS IN GRAPHICS UNIT

(75) Inventors: Craig M. Okruhlica, San Jose, CA (US); Brijesh Tripathi, San Jose, CA (US); Nitin Bhargava, San Jose, CA (US)

(73) Assignee: Apple Inc., Cupertino, CA (US)

( * ) Notice: Subject to any disclaimer, the term of this patent is extended or adjusted under 35 U.S.C. 154(b) by 910 days.

(21) Appl. No.: 13/401,726

(22) Filed: Feb. 21, 2012

(65) Prior Publication Data

US 2013/0215134 A1   Aug. 22, 2013

(51) Int. Cl.
*G09G 5/02* (2006.01)
*G09G 5/36* (2006.01)
*G06T 1/20* (2006.01)
*G06T 17/00* (2006.01)
*G06F 1/32* (2006.01)

(52) U.S. Cl.
CPC ............. *G09G 5/363* (2013.01); *G06F 1/325* (2013.01); *G06T 1/20* (2013.01); *G06T 17/00* (2013.01); *G06T 2210/32* (2013.01); *G09G 2330/021* (2013.01); *G09G 2340/10* (2013.01)

(58) Field of Classification Search
CPC ....... G06T 17/00; G06T 2210/32; G06T 1/20; G06T 1/60; G09G 2340/10; G09G 5/363; G09G 2330/021–2330/024; G06F 1/325–1/3284
USPC ............................. 345/589, 89, 531; 348/600
See application file for complete search history.

(56) References Cited

U.S. PATENT DOCUMENTS

| | | | | |
|---|---|---|---|---|
| 5,896,136 A | * | 4/1999 | Augustine | G06T 11/001 345/605 |
| 6,100,899 A | * | 8/2000 | Ameline | G09G 5/393 345/605 |
| 6,348,919 B1 | | 2/2002 | Murphy | |

(Continued)

FOREIGN PATENT DOCUMENTS

| | | |
|---|---|---|
| JP | 2007060114 | 3/2007 |
| JP | 2007060114 A | 8/2007 |
| JP | 2010171824 A | 5/2010 |
| WO | 2008/150854 | 12/2008 |

OTHER PUBLICATIONS

International Search Report and Written Opinion in related Application No. PCT/US2013/025743, Apr. 23, 2013, pp. 1-9.

(Continued)

*Primary Examiner* — Charles Tseng
(74) *Attorney, Agent, or Firm* — Meyertons, Hood, Kivlin, Kowert & Goetzel, P.C.; Erik A. Heter

(57) ABSTRACT

A graphics processing circuit and method for power savings in the same is disclosed. In one embodiment, a graphics processing circuit includes a number of channels. The number of channels includes a number of color component channels that are each configured to process color components of pixel values of an incoming frame of graphics information. The number of channels also includes an alpha scaling channel configured to process alpha values (indicative of a level of transparency) for the incoming and/or outgoing frames. The graphics processing circuit also includes a control circuit. The control circuit is configured to place the alpha scaling channel into a low-power state responsive to determining that at least one of the incoming or outgoing frames does not include alpha values.

19 Claims, 4 Drawing Sheets

(56) References Cited

U.S. PATENT DOCUMENTS

| | | | |
|---|---|---|---|
| 7,710,427 B1 | 5/2010 | Hutchins et al. | |
| 7,969,446 B2 | 6/2011 | Hutchins et al. | |
| 8,072,394 B2 | 12/2011 | Ludden | |
| 2004/0150596 A1 | 8/2004 | Uchida et al. | |
| 2005/0195200 A1* | 9/2005 | Chuang | G06F 12/0862 345/519 |
| 2005/0253861 A1* | 11/2005 | Hutchins et al. | 345/561 |
| 2006/0152519 A1 | 7/2006 | Hutchins et al. | |
| 2006/0282826 A1 | 12/2006 | Dockser | |
| 2008/0030376 A1 | 2/2008 | Tunnell et al. | |
| 2008/0122825 A1* | 5/2008 | Choi et al. | 345/211 |
| 2008/0186393 A1* | 8/2008 | Lee | G09G 3/3406 348/301 |
| 2008/0303750 A1* | 12/2008 | Ludden et al. | 345/55 |
| 2008/0303767 A1* | 12/2008 | Ludden et al. | 345/89 |
| 2009/0073168 A1 | 3/2009 | Jiao et al. | |
| 2011/0090251 A1* | 4/2011 | Donovan | G06T 15/005 345/632 |
| 2012/0229603 A1* | 9/2012 | Bruls | H04N 13/0048 348/43 |
| 2013/0128120 A1* | 5/2013 | Chanda | 348/600 |

OTHER PUBLICATIONS

International Preliminary Report on Patentability, mailed Sep. 4, 2014, Apple Inc., pp. 1-6.
KIPO's Notice of Preliminary Rejection (English Translation) in Korean Patent Application No. 10-2014-7024015 issued Sep. 10, 2015.
Non-final Office Action, Taiwan Application No. 102105758, mailed Jun. 26, 2015, 7 pages.
Non-Final Office Action, Japanese Application No. 2014556800, mailed Jul. 29, 2015, 10 pages.
Notice of Preliminary Rejection in Korean Application No. 10-2014-7024015 issued Mar. 22, 2016.
Notification of the Second Office Action in Application No. 201380008857.1 issued Jul. 22, 2016.
Notice of Allowance Korean Patent Application No. 10-2014-7024015 issued Jul. 27, 2016.
Office Action from Taiwanese Application No. 102105758, issued Sep. 10, 2014, English and Chinese versions, pp. 1-15.
First Office Action in application CN 201380008857.1 issued Dec. 25, 2015.

\* cited by examiner

ALPHA CHANNEL POWER SAVINGS IN GRAPHICS UNIT

BACKGROUND

Field of the Invention

This disclosure relates to integrated circuits, and more particularly, to power savings in integrated circuits having graphics processing circuitry.

Description of the Related Art

In recent years, the number and type of devices that can process and display complex graphics has significantly increased. Processing and displaying high-resolution graphics were once limited to higher-end computer systems. In recent years, smaller, portable devices have incorporated the capability to process and display high resolution graphics. Such devices include (but are not limited to) smart phones and tablet computers.

In addition to the incorporation of high-resolution graphics processing capability in a wide variety of platforms, a large number of different graphics formats have proliferated. The various graphics formats may each have different processing requirements. Many such graphics formats include a number of different streams for processing colors (e.g., red, green, and blue). Some graphics formats may also include what is known as alpha data. The alpha data may indicate a level of transparency for information to be displayed, ranging from completely transparent to completely opaque.

In some platforms, conversion between different graphics formats may be performed. Circuitry and/or software may be provided to receive graphics information in one format and to convert and output equivalent graphics information in another format. Such conversions may include converting between two formats in which one, both, or neither includes an alpha component.

SUMMARY

A graphics processing circuit and method for power savings in the same is disclosed. In one embodiment, a graphics processing circuit includes a number of channels. The number of channels includes a number of color component channels that are each configured to process color components of pixel values of an incoming frame of graphics information. The number of channels also includes an alpha scaling channel configured to process alpha values (indicative of a level of transparency) for the incoming and/or outgoing frames. The graphics processing circuit also includes a control circuit. The control circuit is configured to place the alpha scaling channel into a low-power state responsive to determining that at least one of the incoming or outgoing frames does not include alpha values.

In one embodiment, a method includes a graphics processing unit receiving an incoming frame of graphics information and providing a corresponding outgoing frame of graphics information. The graphics information may be received into a number of channels configured to process data in the incoming frame to produce the outgoing frame. The number of channels may include color component channels and an alpha channel configured to process alpha data. The method may further included determining if at least one of the incoming or outgoing frames does not include alpha data. If at least one of the incoming or outgoing frames does not include alpha data, the alpha channel may be placed into a low power state.

BRIEF DESCRIPTION OF THE DRAWINGS

The following detailed description makes reference to the accompanying drawings, which are now briefly described.

Figure 1:
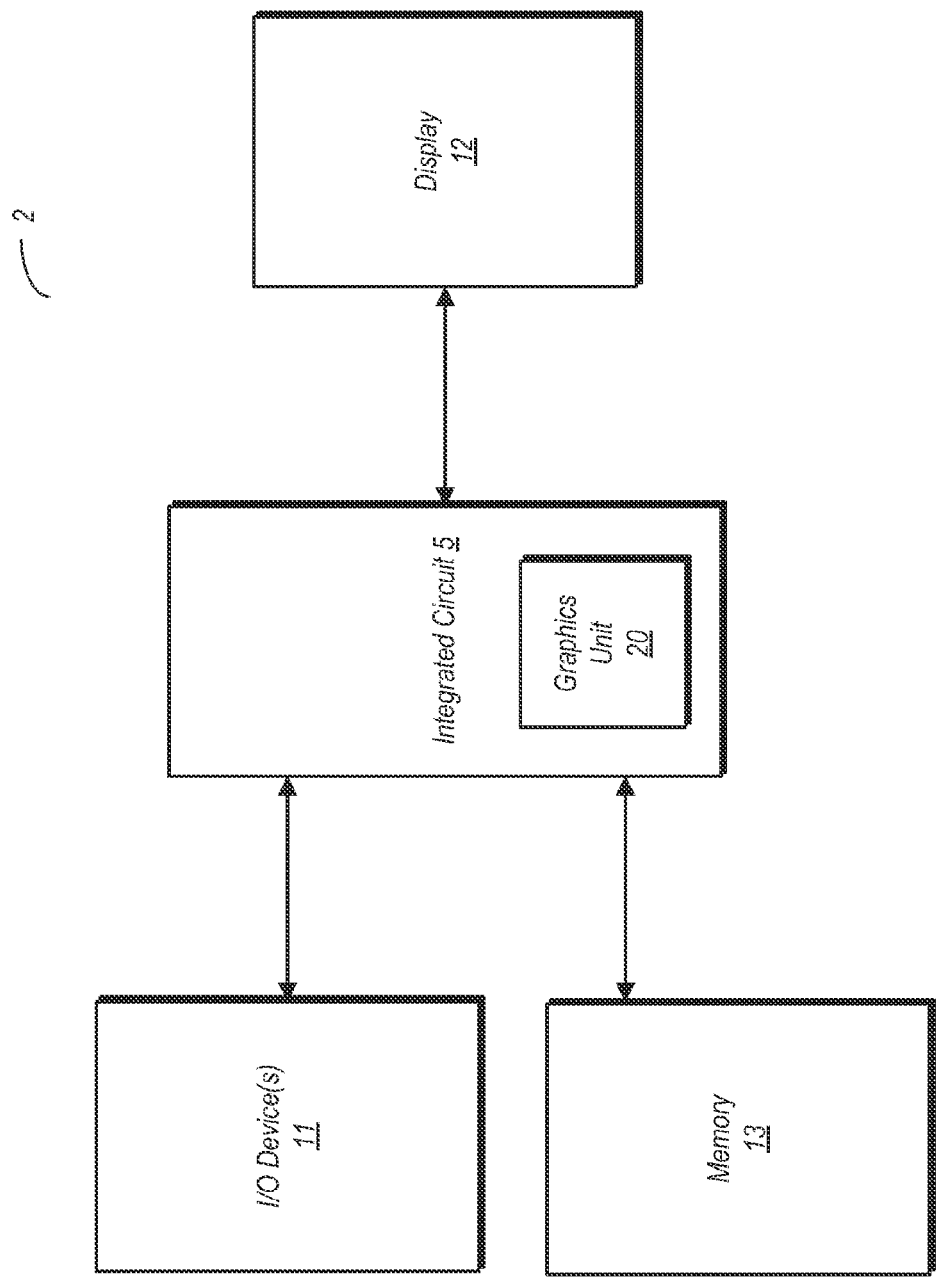
FIG. 1 is a block diagram of one embodiment of a system including an integrated circuit having a graphics processing unit.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component.

DETAILED DESCRIPTION OF EMBODIMENTS

FIG. 1 is a block diagram of one embodiment of a system including an integrated circuit having a graphics processing unit. In the embodiment shown, system 2 includes an integrated circuit 5, I/O devices 11 (which may include one or more input/output devices), memory 13, and display 12. Integrated circuit 5 in the embodiment shown includes a graphics unit 20 configured to process graphics information. Integrated circuit 5 may be a system on a chip (SOC) or other type of integrated circuit that includes graphics processing circuitry. In some cases, system 2 may be a portable device such as a smart phone, a tablet, or a laptop computer. However, embodiments of system 2 that are implemented in other ways (e.g., as a desktop computer) are also possible and contemplated.

In the embodiment shown, I/O devices 11 may include one or more units which may convey information for input to integrated circuit 5. I/O devices 11 may also include one or more units configured to output information received from integrated circuit 5. The types of devices included in I/O devices 11 may vary widely from one embodiment to the next. Such devices may include (but are not limited to) radio transceivers for cellular communications systems, touch screen systems, radio transceivers for a global positioning system (GPS) unit, keyboards, wi-fi transceivers, peripheral bus interfaces, and so on.

In the embodiment shown, integrated circuit 5 may communicate with I/O devices 11 and memory 13. Integrated circuit 5 may read information from and write information to memory 13. In one embodiment, memory 13 may be a volatile memory, while in other embodiments memory 13 may be a non-volatile memory. Embodiments including both volatile and non-volatile memories are also possible and contemplated. Various memory types that may be used to implement memory 13 include (but are not limited to) dynamic random access memory (DRAM), static RAM (SRAM), flash memory, and so forth.

Display 12 in may be any type of display suitable for implementation in the particular embodiment of system 2. Information processed by graphics unit 20 may be output from integrated circuit 5 to be displayed on display 12. Information displayed on display 12 may include (but is not limited to) video, icons, a graphical user interface, and text. In some situations, the information to be displayed may initially be received by integrated circuit 5 may be received from one of the I/O devices 11 or from memory 13. Information that is internally generated by integrated circuit 5 may also be displayed. In some cases, display 12 may be a touch screen display, and may thus be used to provide inputs into in integrated circuit 5. In such embodiments, information to be displayed may be updated according to the user inputs from the touch screen.

Figure 2:
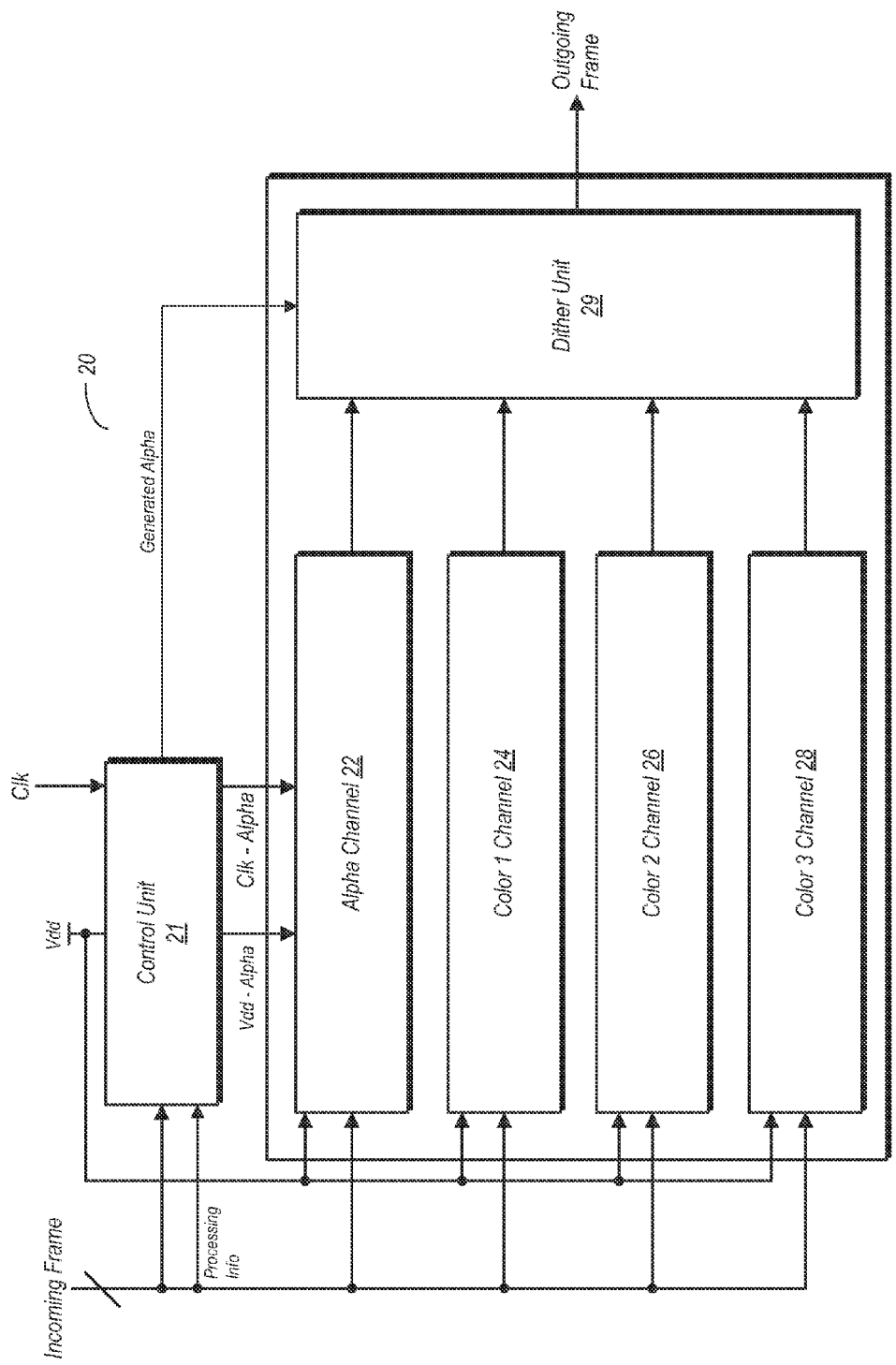
FIG. 2 is a block diagram illustrating one embodiment of a graphics processing unit.

Turning now to FIG. 2, a block diagram illustrating one embodiment of graphics processing unit 20. In the embodiment shown, graphics processing unit 20 includes a control unit 21 and a number of channels for processing graphics information received in incoming frames. The channels in the embodiment shown include alpha channel 22, color 1 channel 24, color 2 channel 26, and color 3 channel 28. Graphics unit 20 also includes a dither unit coupled to receive the information from each of the channels and is configured to perform the final processing prior to providing the outgoing frame to display 12.

Each of the color channels may process information relating to a color for pixel data contained in the incoming frame. At least some of the processing may be performed according to the format of the incoming frame and the format of the corresponding outgoing frame to be produced. In various embodiments, formats may include the RGB (red, green, blue) and related formats, the YUV (where Y=luma, while U and V are color information), and so forth. In general, incoming frame information in any suitable display format may be processed by graphics unit 20, and thus embodiments of the same are not limited to those formats explicitly disclosed herein. Furthermore, among the functions provided the channels of graphics unit 20 may be converting the incoming frame from a first format to a second format for the outgoing frame.

Alpha channel 22 in the embodiment shown is configured to process alpha values for pixel data of incoming frames. An alpha value may indicate a level of transparency for the frame. In terms of transparency, the range of alpha values may extend from completely transparent to completely opaque. Some display formats may include alpha values for pixel data of each frame of information, while other display formats may lack alpha data. In some cases, both the incoming and outgoing frames may be in respective formats that include alpha data. In other cases, at least one of the incoming or outgoing frames may be in respective formats that lack alpha data. At other times, both respective formats of the incoming and outgoing frames may lack alpha data.

In the embodiment shown, control unit 21 is configured to receive the incoming frame and is further configured to receive processing information. Using the information in the incoming frame and the processing information, control unit 21 may determine if the respective formats of one or both of the incoming or outgoing frames is lacking alpha data. If the format of at least one of the incoming and outgoing frames is lacking alpha data, control unit 21 may place alpha channel 22 in a low power state. In the embodiment shown, alpha channel 22 may be placed in the low power state by either clock gating the alpha channel (i.e. inhibiting a clock signal from being provided thereto) or power gating the alpha channel (i.e. inhibiting power from being supplied to the alpha channel). In some embodiments, only one of the clock gating or power gating options may be implemented for placing alpha channel 22 in a low power state.

In some cases, the format of the incoming frame may be one that does not include alpha values, while the format of the outgoing frame is one that does include alpha values. In such cases, control unit 21 may generate the alpha values and provide them to dither unit 29. Dither unit 29 may perform dithering and other functions that include assembling the various components of the outgoing frame. Subsequent to its assembly, dither unit 29 may provide the outgoing frame to display 12.

Each of the channels, when active, may perform various processing functions on received pixel data. One function that may be performed is scaling, wherein the resolution of an incoming frame may be changed for a corresponding outgoing frame. Scaling may include reducing the resolution of the outgoing frame (relative to the incoming frame) or increasing the resolution of the outgoing frame. Another function that may be performed by the various channels of graphics unit 20 may include rotating an image (e.g., changing its orientation by 90 degrees). Still another function that may be performed by the various channels of graphics unit 20 may include converting the format of the incoming frame to a different format for the outgoing frame. In general, the various channels may perform a wide variety of graphics processing functions. It is further noted that each of the provided graphics processing functions are not necessarily performed in every operational instance. For example, scaling may not be performed in instances when the outgoing frame is to be provided at the same resolution of the incoming frame.

Figure 3:
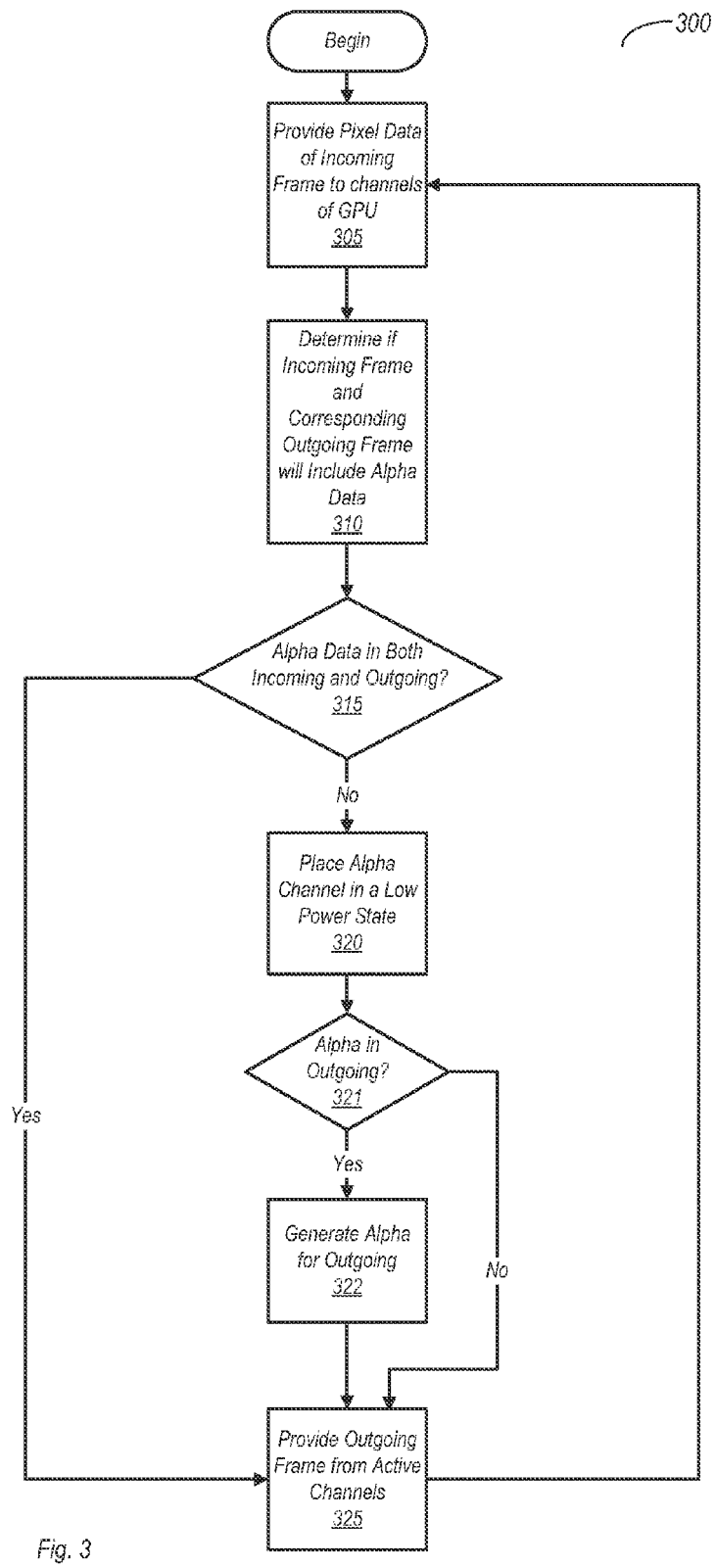
FIG. 3 is a flow diagram of one embodiment of a method for determining whether to place an alpha channel of a graphics processing unit in a low power state.

FIG. 3 is a flow diagram of one embodiment of a method for determining whether to place an alpha channel of a graphics processing unit in a low power state. Method 300 as illustrated in FIG. 3 may be performed using the various embodiments of a system and graphics processing unit as discussed above. Furthermore, it is also contemplated that method 300 may be performed in other embodiments of a system and graphics processing unit not explicitly disclosed herein.

In the embodiment shown, method 300 begins with the receiving pixel data of an incoming frame by a graphics processing unit (block 305). Upon receiving the incoming frame as well as information as to how it is to be processed (e.g., formatting, scaling, etc.), a determination may be made as to whether at least one of the incoming and outgoing frames is lacking alpha data (block 310). If it is determined that both the incoming and outgoing frames include alpha data (block 315, yes), then the pixel information may be processed in corresponding channels, which includes the processing of alpha data in an alpha channel.

Subsequently, the information for the outgoing frame may be provided from the active channels (block 325).

If one or both of the incoming and outgoing frames does not include alpha data (block 315, no), then the alpha channel may be placed in a low power state (block 320). The placing of the alpha channel in a low power state may be accomplished by clock gating in some embodiments. Embodiments in which the alpha channel may be placed in a low power state by power gating are also possible and contemplated. Embodiments in which clock gating and power gating are both options for placing the alpha channel in a low power state may also be implemented.

If the incoming channel lacks alpha data but the outgoing channel includes alpha data (block 321, yes), then alpha data may be generated for the outgoing frame (block 322). The method may then proceed to block 325. If neither of the outgoing and incoming frames include lack alpha data (block 321, no), then no alpha data is generated, and the method proceeds to block 325. After block 325, the method may return to block 305 and repeat.

Figure 4:
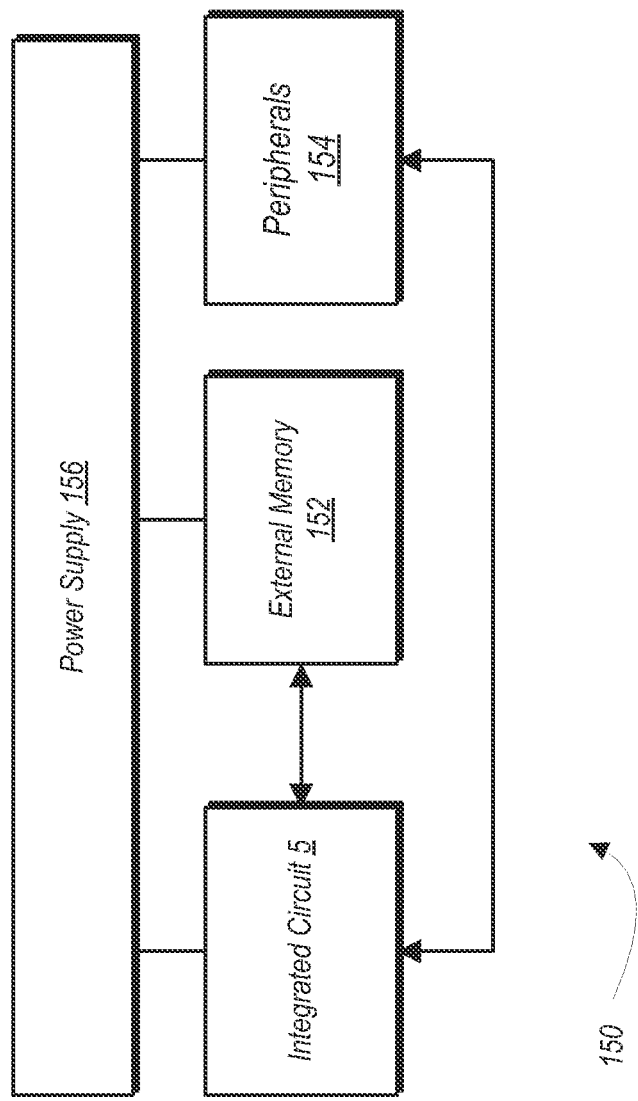
FIG. 4 is a block diagram of one embodiment of an exemplary system.

Turning next to FIG. 4, a block diagram of one embodiment of a system 150 is shown. In the illustrated embodiment, the system 150 includes at least one instance of the IC 5 coupled to external memory 152. IC 5 in the embodiment shown may be an IC that includes those features shown in FIG. 1. IC 5 is also coupled to one or more peripherals 154. A power supply 156 is also provided which supplies the supply voltages to the IC 5 as well as one or more supply voltages to the memory 152 and/or the peripherals 154. In some embodiments, more than one instance of the IC 5 may be included (and more than one external memory 152 may be included as well).

The peripherals 154 may include any desired circuitry, depending on the type of system 150. For example, in one embodiment, the system 150 may be a mobile device (e.g. personal digital assistant (PDA), smart phone, etc.) and the peripherals 154 may include devices for various types of wireless communication, such as wifi, Bluetooth, cellular, global positioning system, etc. The peripherals 154 may also include additional storage, including RAM storage, solid state storage, or disk storage. The peripherals 154 may include user interface devices such as a display screen, including touch display screens or multitouch display screens, keyboard or other input devices, microphones, speakers, etc. In other embodiments, the system 150 may be any type of computing system (e.g. desktop personal computer, laptop, workstation, net top etc.).

Numerous variations and modifications will become apparent to those skilled in the art once the above disclosure is fully appreciated. It is intended that the following claims be interpreted to embrace all such variations and modifications.

What is claimed is:

1. A graphics processing circuit comprising:
a plurality of color component channels each configured to scale a color component of a pixel value of an incoming frame of graphics information;
an alpha scaling channel configured to scale an alpha value of a pixel from the incoming frame of graphics information, wherein the alpha value is indicative of a level of transparency of the pixel of the one of the incoming or outgoing frames; and
a control circuit configured to place the alpha scaling channel in a low power state responsive to determining at least one of the incoming frame and an outgoing frame does not include alpha values, wherein the control circuit is further configured to generate alpha values for the outgoing frame responsive to determining that the outgoing frame is to include alpha values and the input frame does not include alpha values.

2. The graphics processing circuit as recited in claim 1, wherein the control circuit is configured to clock-gate the alpha scaling channel responsive to determining at least one of the incoming and outgoing frames does not include alpha values.

3. The graphics processing circuit as recited in claim 1, wherein the control circuit is configured to power gate the alpha scaling channel responsive to determining at least one of the incoming and outgoing frames does not include alpha values.

4. The graphics processing circuit as recited in claim 1, wherein each of the plurality of color component channels is configured to convert correspondingly received pixel data from the incoming frame from a first format to a second format.

5. The graphics processing circuit as recited in claim 1, further comprising a dither unit coupled to receive outputs from each of the plurality of color component channels and the alpha scaling channel, and wherein the dither unit is further coupled to receive generated alpha values from the control unit when the incoming frame lacks alpha data and the outgoing frame is to include alpha data, wherein the dither unit is configured to assemble components of the outgoing frame.

6. A method comprising:
providing pixel data of an incoming frame of graphics information to a plurality of channels of a graphics processing circuit, the plurality of channels including an alpha channel and a plurality of color coding channels;
determining if the incoming data frame and an outgoing data frame include alpha data indicative of a level of transparency for a data frame in which it is included;
placing the alpha channel in an idle state, using a control circuit, if at least one of the incoming and outgoing data frames does not include alpha data; and
generating alpha data for the outgoing frame, using the control circuit, if the outgoing frame includes alpha data and the incoming frame does not include alpha data.

7. The method as recited in claim 6, wherein placing the alpha channel in the idle state comprises clock-gating the alpha channel.

8. The method as recited in claim 6, wherein placing the alpha channel in the idle state comprises power gating the alpha channel.

9. The method as recited in claim 6, further comprising scaling pixel data in each of the color coding channels.

10. The method as recited in claim 6, further comprising:
providing alpha data from the control circuit to a dithering unit; and
assembling components of the outgoing frame using the dithering unit.

11. An integrated circuit comprising:
a plurality of channels configured to receive an input frame of graphics information in a first format and further configured to provide a corresponding output frame in a second format, wherein the plurality of channels include:
a plurality of color component scaling channels each configured to scale a color component of a pixel value from the input frame; and
an alpha scaling channel configured to scale an alpha value of a pixel of from the input frame, the alpha value indicating a level of transparency of the pixel from the input frame; and wherein the integrated circuit further includes a controller configured to put the alpha scaling channel into a low power state responsive to determining that at least one of the input and output frames does not include pixels having alpha values, and wherein the controller is configured to generate alpha data for the output frame responsive to determining that the output frame includes alpha data and the input frame does not include alpha data.

12. The integrated circuit as recited in claim 11, wherein the controller is configured to inhibit a clock signal from being provided to the alpha scaling channel responsive to determining that at least one of the input and output frames does not include pixels having alpha values.

13. The integrated circuit as recited in claim 11, wherein the controller is configured to inhibit a supply voltage from being provided to the alpha scaling channel responsive to determining that at least one of the input and output frames does not include pixels having alpha values.

14. The integrated circuit as recited in claim 11, further comprising a dithering unit coupled to outputs of each of the plurality of color component channels, the alpha channel, and the controller, wherein the controller is configured to provide generated alpha data to the dithering unit responsive to determining that the output frame includes alpha data and the input frame does not include alpha data, and wherein the dithering unit is configured to assemble components of the outgoing frame.

15. A method comprising:
providing an input frame of graphics information to a graphics processing circuit having a plurality of channels, wherein the plurality of channels includes a channel configured to process alpha data indicative of a level of transparency, and a plurality of color channels configured to process color components for pixels of the input frame;
determining if the input frame includes alpha data;
determining if an output frame to be provided by the graphics processing circuit will include alpha data;
clock-gating the alpha channel, using a control circuit, responsive to determining that at least one of the input and output frame does not include alpha data; and
generating alpha data for the output frame, using the control circuit, responsive to determining that the output frame includes alpha data and the input frame does not include alpha data.

16. The method as recited in claim 15, further comprising:
receiving the input frame in a first format; and
generating the output frame in a second format, based on the input frame, wherein generating the output frame comprises converting the input frame from the first format to the second format.

17. The method as recited in claim 15, further comprising receiving the input frame at a first resolution and providing the output frame at a second resolution.

18. A graphics processor comprising:
an alpha channel, wherein the alpha channel is configured to process alpha data in an incoming frame, the alpha data being indicative of a level of transparency of pixels of the incoming frame;
a plurality of color channels, wherein each of the color channels is configured to process color data for pixels of the incoming data frame;
a control circuit configured to determine a format of the incoming frame and a format of an outgoing frame provided collectively by the plurality of color channels and the alpha channel, wherein the control circuit is further configured to clock gate the alpha channel responsive to determining that a format of at least one of the incoming or outgoing data frame does not include alpha data, and wherein the control circuit is configured to generate and provide alpha data for an outgoing frame responsive to determining that the second format includes alpha data and the first format does not include alpha data.

19. The graphics processor as recited in claim 18, wherein the plurality of channels and the alpha channel are configured to convert graphics information from a first format to a second format, wherein the incoming frame is in the first format and the outgoing frame is in the second format.

* * * * *

UNITED STATES PATENT AND TRADEMARK OFFICE
CERTIFICATE OF CORRECTION

| | | |
|---|---|---|
| PATENT NO. | : 9,691,360 B2 | Page 1 of 1 |
| APPLICATION NO. | : 13/401726 | |
| DATED | : June 27, 2017 | |
| INVENTOR(S) | : Craig M. Okruhlica et al. | |

It is certified that error appears in the above-identified patent and that said Letters Patent is hereby corrected as shown below:

In the Claims

Column 6, Claim 11, Line 67, please delete "pixel of from the input" and substitute --pixel from the input--.

Signed and Sealed this
Twenty-sixth Day of September, 2017

Joseph Matal
*Performing the Functions and Duties of the
Under Secretary of Commerce for Intellectual Property and
Director of the United States Patent and Trademark Office*